United States Patent [19]
Fujita et al.

[11] Patent Number: 5,460,214
[45] Date of Patent: Oct. 24, 1995

[54] PNEUMATIC TIRES HAVING IMPROVED UNIFORMITY AT TIRE-WHEEL ASSEMBLED STATE

[75] Inventors: Kazuto Fujita; Mitsunori Wada, both of Tokyo, Japan

[73] Assignee: Bridgestone Corporation, Tokyo, Japan

[21] Appl. No.: 29,708

[22] Filed: Mar. 11, 1993

[30] Foreign Application Priority Data

| Mar. 11, 1992 | [JP] | Japan | 4-52610 |
| Jul. 30, 1992 | [JP] | Japan | 4-203744 |
| Aug. 19, 1992 | [JP] | Japan | 4-220204 |
| Aug. 19, 1992 | [JP] | Japan | 4-220205 |
| Sep. 30, 1992 | [JP] | Japan | 4-261791 |
| Jan. 20, 1993 | [JP] | Japan | 5-007748 |

[51] Int. Cl.$^6$ .............. B60C 15/02; B60C 15/024; B60C 15/05; B60C 15/06
[52] U.S. Cl. .............. 152/540; 152/539; 152/543; 152/544; 152/545; 152/547
[58] Field of Search .................. 152/539, 540, 152/542, 543, 544, 547, 545

[56] References Cited

U.S. PATENT DOCUMENTS

| 2,698,042 | 12/1954 | Perkins | 152/544 |
| 2,825,383 | 3/1958 | Spelman | 152/544 |
| 3,203,461 | 8/1965 | Enabnit. | |
| 3,736,974 | 6/1973 | Lejeune | 152/544 |
| 3,949,800 | 4/1976 | Lejeune | 152/540 |
| 4,260,006 | 4/1981 | Udall et al. | 152/544 |
| 4,434,831 | 3/1984 | Uemura | 152/544 |
| 4,508,153 | 4/1985 | Tanaka et al. | 152/543 |
| 4,896,709 | 1/1990 | Alie et al. | 152/543 |
| 4,953,605 | 9/1990 | Kawamura et al. | 152/547 |

FOREIGN PATENT DOCUMENTS

| 0122731 | 11/1946 | Australia. |
| 0202333 | 2/1956 | Australia. |
| 0129675 | 1/1985 | European Pat. Off.. |
| 1138358 | 9/1955 | France. |
| 2429111 | 1/1980 | France. |
| 2607753 | 12/1987 | France. |
| 0938767 | 2/1956 | Germany. |
| 0114102 | 10/1978 | Japan. |
| 0151406 | 9/1982 | Japan. |
| 0344668 | 12/1989 | Japan. |
| 2200504 | 8/1990 | Japan. |
| 9201578 | 2/1992 | WIPO. |

*Primary Examiner*—Adrienne C. Johnstone
*Attorney, Agent, or Firm*—Sughrue, Mion, Zinn, Macpeak & Seas

[57] ABSTRACT

A pneumatic tire having an improved uniformity at tire-wheel assembled state includes a pair of bead portions each closely fitted to a slant bead seat of a standard rim when the tire is mounted on the standard rim, the standard rim including for each bead portion, a rounded concave corner portion smoothly connected to the corresponding slant bead seat and a flange protrusively extending outward from the corresponding rounded concave corner portion and having a curved portion. In this tire, each bead portion has an expanded heel bringing about close fitting to the corresponding rounded concave corner portion prior to a contact between the corresponding curved portion and the corresponding bead portion.

17 Claims, 4 Drawing Sheets

FIG_1
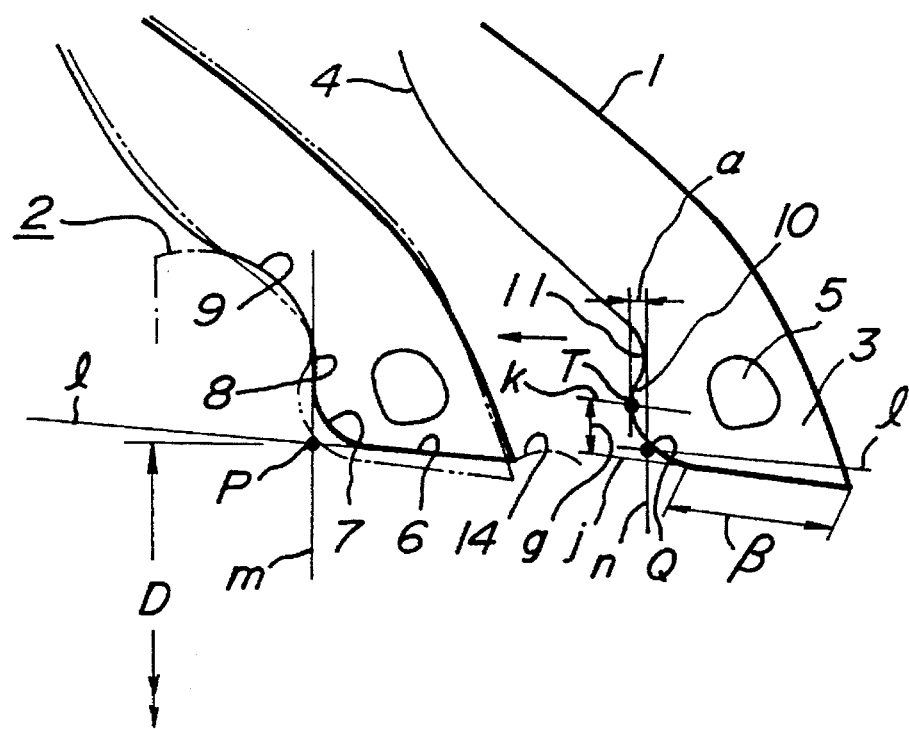
FIG_2
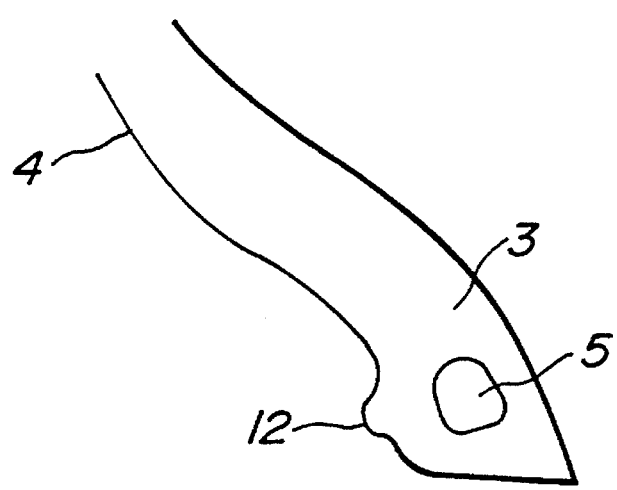

FIG_3
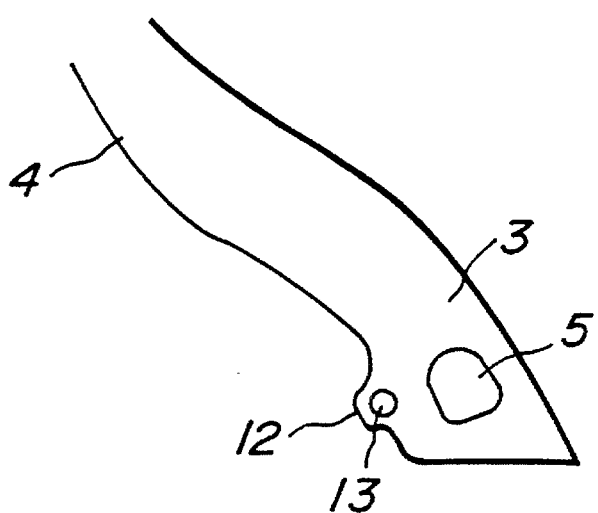
FIG_4
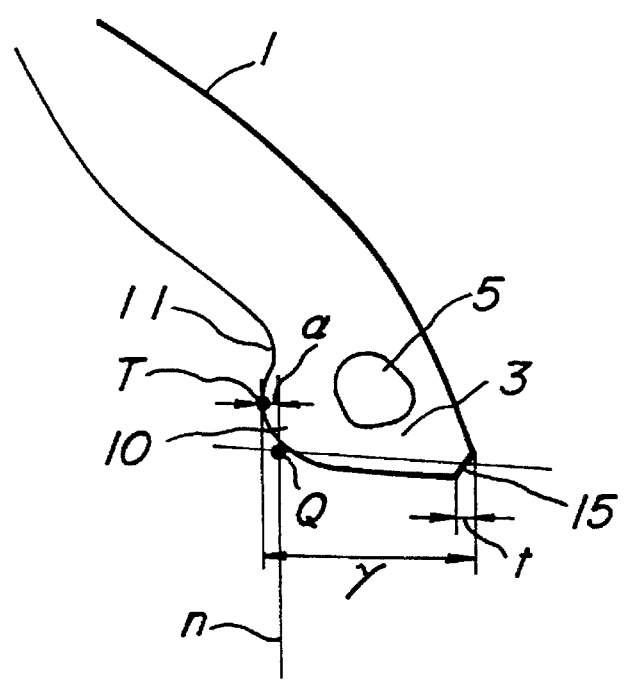

FIG_5
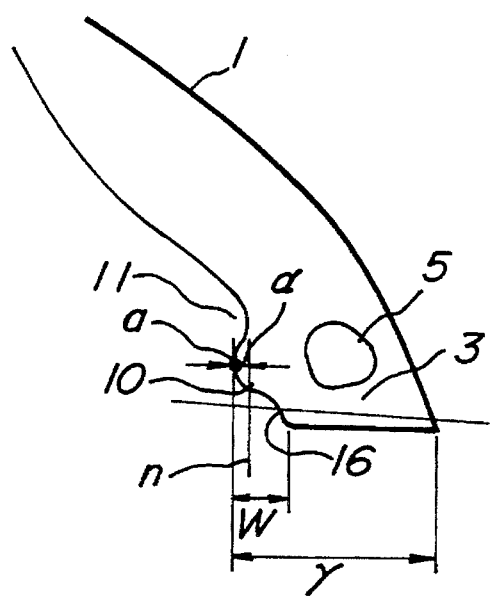
FIG_6
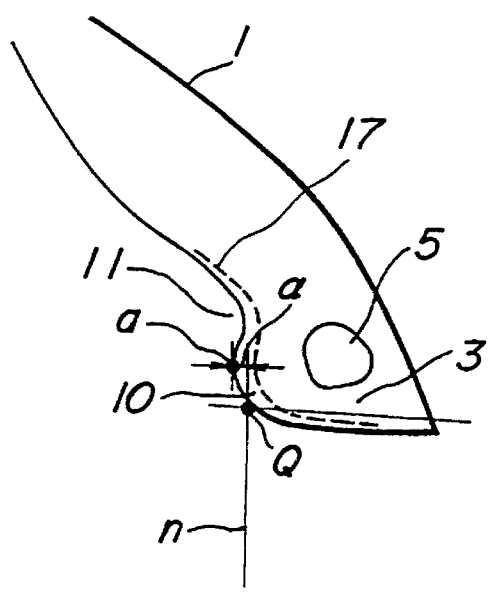

FIG_7
PRIOR ART
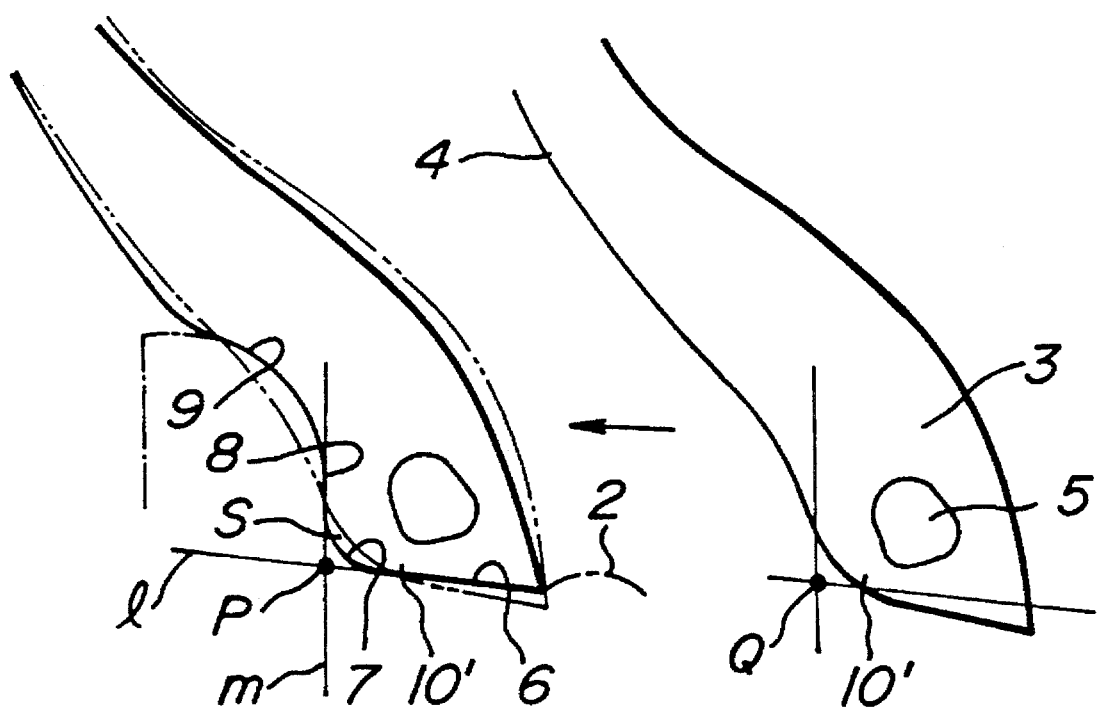

PNEUMATIC TIRES HAVING IMPROVED UNIFORMITY AT TIRE-WHEEL ASSEMBLED STATE

BACKGROUND OF THE INVENTION

1. Field of the Invention

This invention relates to a pneumatic tire having an improved uniformity at a tire-wheel assembled state. More particularly it relates to a pneumatic tire capable of lessening radial runout (hereinafter abbreviated as RRO) and effectively controlling radial force variation (hereinafter abbreviated as RFV) by providing satisfactory uniformity at a tire-wheel assembled state when the tire is mounted on a rim standardized in Japan Automobile Tire Manufacturing Association (JATMA), The Tire and Rim Association, Inc. (TRA) or the like (hereinafter referred to as a "standard rim" such as a two piece divided type rim, 5 degree full drop center rim, 15 degree full drop center rim, wide flat base rim and the like.

2. Description of the Related Art

As to the reduction of RFV in a tire-wheel assembly after a pneumatic tire is mounted on a rim, Japanese Patent laid open No. 3-189201 discloses that a spacer is interposed between a bead portion of the tire and a flange of the rim at a position corresponding to a large value of RRO measured at a shoulder portion of the tire in its circumference. In this case, however, it is required to repeat the operation of assembling the tire on the rim and supplying air into the tire, which considerably obstructs the operability of the rim assembling. Also there is a fear of causing a disorder due to external force applied to the tire-wheel assembly.

On the other hand, it is known that the tire after the vulcanization is mounted onto the rim so as to have a position of maximum peak in a waveform showing the change of RFV measured on the tire itself coincide with a position of minimum peak in a waveform showing a variation of scale deflection separately measured on the outer periphery of the rim. However, such rim assembling is no longer meaningless owing to the improvement of rim working accuracy.

With the advance of studies on ride comfortability against vibrations and noise of automobiles, particularly passenger cars, uniformity at tire-wheel assembled state becomes important.

The term "uniformity at tire-wheel assembled state" does not mean that the tire-wheel assembly is merely a true circle in its shape, but means that the deflection on the periphery of the assembly is equal at any positions under the same load or the reaction force and is uniform during the rotation of the assembly under a certain deflection because RRO among the measures for the evaluation of the uniformity or the scale deflection of the outer periphery on the tire and rim degrades the variation of radial reaction force or RFV when the tire-wheel assembly is rotated under a certain deflection.

SUMMARY OF THE INVENTION

The inventors have discovered that RRO as the tire-wheel assembly becomes not small even when the tire having good RRO is mounted on the standard rim having a sufficiently improved working accuracy, which results from the eccentrically assembled state of the tire on the rim.

The invention is based on the above discovery and provides a pneumatic tire having an improved uniformity at tire-wheel assembled state and capable of effectively controlling RFV as a tire-wheel assembly by improving a bead portion of the tire to easily attain concentrically assembled state when the tire is mounted on the rim.

According to the invention, there is the provision of a pneumatic tire having an improved uniformity at tire-wheel assembled state and including a pair of bead portions each closely fitted into a slant bead seat of a standard rim when the tire is mounted on the standard rim, the standard rim including for each bead portion a rounded concave corner portion smoothly connected to the corresponding slant bead seat and a flange protrusively extending outward from the corresponding rounded concave corner portion and having a curved portion in a direction opposite to the protruding direction. Each bead portion has an expanded heel bringing about close fitting to the corresponding rounded concave corner portion of the standard rim over its full periphery prior to a contact between the corresponding curved portion of the standard rim and an outer surface of the corresponding bead portion facing thereto.

The preferable embodiments of the invention are as follows. Each bead portion has an annular depression adjacent to the corresponding expanded heel and facing the corresponding flange near the corresponding rounded concave corner portion. Each expanded heel is a local torus, which is reinforced with a ring-shaped core embedded therein. A ratio of the expansion quantity of an expanded heel, measured between a line passing through a bead base point and perpendicular to an axis of the tire and a line in contact with the corresponding flange and perpendicular to an axis of the tire, and a fitted width of a radially inward face of the corresponding bead portion is within a range of 0.06–0.30. Further, each bead portion has a chamfered portion facing a hump of the standard rim at a bead toe located at a side opposite the corresponding expanded heel, and a ratio of an axial length of a chamfered portion to an axial width of the corresponding bead portion is within a range of 0.2–0.4. An annular groove is formed in the bottom of each expanded heel over its full periphery, and a ratio of an axial width of an annular groove to the axial width of the corresponding bead portion is within a range of 0.2–0.3. Each expanded heel is provided with a cord reinforcing layer arranged along a contour of the corresponding expanded heel.

BRIEF DESCRIPTION OF THE DRAWINGS

The invention will be described with reference to the accompanying drawings, wherein:

FIG. 1 is schematically partial section views of a first embodiment of the pneumatic tire according to the invention together with a state of mounting the tire on a rim;

FIGS. 2 to 6 are schematically partial views of another embodiments of the pneumatic tire according to the invention, respectively; and FIG. 7 is schematically partial section views of the conventional pneumatic tire together with a state of mounting the tire on a rim.

DESCRIPTION OF THE PREFERRED EMBODIMENTS

In FIG. 1 is shown a first embodiment of the pneumatic tire according to the invention and a main part for mounting this tire on a standard rim, wherein numeral 1 is a pneumatic tire, numeral 2 a standard rim, numeral 3 a bead portion of the tire, numeral 4 a sidewall portion, numeral 5 a bead core, numeral 6 a slant bead seat (usually 5°±1°) of the standard rim 2, numeral 7 a rounded concave corner portion, and numeral 8 a flange having a curved portion 9. In the flange 8, a straight portion raised from the rounded concave corner portion may be omitted in accordance with the type of the standard rim 2.

In the invention, the bead portion 3 is fundamentally characterized by having an expanded heel 10. An expansion quantity α of the expanded heel 10 is determined by using as a standard a vertical line n passing through a bead base point Q planned in the tire vulcanization, which corresponds to an intersection point P between an imaginary line l extending from the slant bead seat 6, having a substantially flat bottom surface, toward the rounded concave corner portion 7 in a cross-sectional profile of the standard rim 2 fitted to the tire, and a line m perpendicular to an axial line of the standard rim 2 and in contact with the flange 8. The expansion quantity is preferably within a range of 2–4 mm. The expanded heel 10 is a local torus 12 as shown in FIGS. 2 and 3, or may be a plurality of separate segments facing the rounded concave corner portion 7.

As shown in FIG. 1, an annular depression 11 is formed in the bead portion 3 to be adjacent to the expanded heel 10 and face the flange 8 near the rounded concave corner portion 7. Further, the local torus 12 may be reinforced with a ring-shaped core 13 embedded therein as shown in FIG. 3.

Furthermore, a ratio of the expansion quantity α of the expanded heel 10 to a fitted width β of a radially inward face of the bead portion 3 is within a range of 0.06–0.30. A height of an expanded top T of the expanded heel 10 is represented by a vertical distance g between a line j extending axially inward from the radially inward face of the bead portion 3 and a line k parallel thereto and passing through the top T. The vertical distance g is usually within a range of 1.5–10.5 mm. As shown in FIG. 4, a bead toe of the bead portion 3 located at a side opposite the expanded heel 10 has a chamfered portion 15 corresponding to a hump 14 (FIG. 1) of the standard rim 2. A ratio of length t of the chamfered portion 15 to a width γ of the bead portion 3 in the axial direction of the tire is within a range of 0.2–0.4. As shown in FIG. 5, the expanded heel 10 is provided at its bottom with an annular groove 16 over a full periphery. A ratio of width W of the annular groove 16 in the axial direction to the bead width γ is within a range of 0.2–0.3. As shown in FIG. 6, the expanded heel 10 may be reinforced with a cord reinforcing layer 17 arranged along a contour of the expanded heel 10. In any case, at least expanded heel 10 in the bead portion 3 is fundamentally made from a hard rubber stock having a JIS-A hardness of not less than 60°, preferably not less than 65°.

Moreover, it is desirable that the ring-shaped core 13 is made from an endless band of a substantially inextensible cord such as steel cord or organic fiber cord.

The cord reinforcing layer 17 may be made of cord fabric and plain weave fabric of metal cords such as steel cord or organic fiber cords such as nylon, polyester or the like. These cords are arranged at a certain cord angle with respect to a tangent line at the top T of the expanded heel 10. It is desirable that such a fabric is embedded in the expanded heel 10 along the contour of the expanded heel 10 as shown in FIG. 6 or adhered to the outer surface of the expanded heel 10.

In general, the bead portion 3 of the pneumatic tire 1 has an adequate interference against a rim diameter D defined by using a distance from the intersection point P between the line l and the line m to the axial line of the standard rim 2 as a radius.

When the tire 1 is mounted on the standard rim 2, the bead portion 3 is partly and successively ridden over the curved portion 9 of the rim 2 to fall down in a drop or well of the rim 2 and then moved toward the flange 8 of the rim as shown by arrow in FIG. 1. Thereafter, air is supplied to the inside of the tire 1 or a tube housed in the tire (not shown) to increase an internal pressure up to a standard internal pressure defined for the tire. Thus, the outer surface of the bead portion 3 is pushed along the slant bead seat 6 up to the outer surface of the curved portion 9 by such air pressure.

In FIG. 7 is shown such a rim assembling state with respect to the conventional pneumatic tire having no expanded heel. As the interference of the bead portion 3 against the slant bead seat 6 increases, the degree of closely fitting the bead portion to the rim becomes high. However, the friction resistance of the slant bead seat 2 obstructing the movement of the bead portion 3 is always non-uniform over the full periphery thereof. As a result the outer surface of the bead portion 3 in the tire first contacts the curved portion 9 of the rim 2 at a certain point on the periphery thereof to cause compressive deformation at this point and the bead base point Q approaches to the intersect P while withstanding to such a compressive deformation. Consequently, the rim assembling operation is frequently stopped while non-uniformly causing a space S between the bead heel 10' of the bead portion 3 and the rounded concave corner portion 7 on the periphery of the standard rim 2. For this end, RRO as a tire-wheel assembly becomes large to cause RFV though the tire itself has a sufficient uniformity after the vulcanization.

Under the above rim assembling operation, according to the invention, the expanded heel 10 or the local torus 12 first contacts with the rounded concave corner portion 7 of the standard rim 2 as shown in FIG. 1 to cause compression deformation, through which the outer surface of the bead portion 3 contacts with the curved portion 9 of the flange 8 under an adequate pressure. Therefore, the rotational axis of the tire 1 easily coincides with the rotational axis of the standard rim 2 to lessen RRO as a tire-wheel assembly, whereby RFV can effectively be controlled.

In the tire for the usual passenger car, the expansion quantity α of the expanded heel 10 or local torus 12 is preferably within a range of 2–4 mm and the ratio of the expansion quantity α to the fitting width β of the radially inner face of the bead portion 3 is within a range of 0.06–0.30. When the bead portion 3 has the chamfered portion 15 at its bead toe, it is well engaged with the hump 14 of the standard rim 2, and it is preferable that the ratio of the axial length t of the chamfered portion 15 to the bead width γ is within a range of 0.2–0.4. Further, when the annular groove 16 is formed at the bottom of the expanded heel 10 over its full periphery, riding over the hump 14 is facilitated in the rim assembly, so that the annular groove 16 has preferably an axial width W corresponding to 0.2–0.3 of the bead width γ.

In order that the bead portion 3 is well fitted to the standard rim 2, the expanded heel 10 should be rendered into adequate shape and size. In this case, the expanded heel 10 is determined by the expansion quantity α. When the fitting width β of the radially inner face of the bead portion 3 is defined by a radially inner face length of the bead portion 3 contacting with the slant bead seat 6 of the standard rim 2, if the ratio of the expansion quantity α of the expanded heel 10 to the fitting width β of the bead portion is less than 0.06, the effect of controlling RRO and RFV is substantially lost. If the ratio exceeds 0.3, contact to the rim 2 becomes shallow to lower the contact pressure of the radially inner face of the bead portion and hence the slipping between the tire and the rim (rim slipping) is apt to be caused during running of the tire.

If the bead toe located at a side opposite to the expanded heel 10 of the bead portion 3 does not ride well over the hump 14 of the standard rim 2, rim assembling can not be properly achieved, so that the chamfered portion 15 is formed in the bead toe of the bead portion. When the axial length t of the chamfered portion 15 is within a range of 0.2–0.4 of the bead width γ, the chamfered portion 15 can properly contribute to the close contact of the expanded heel 10 to the rounded concave corner portion 7 without catching the bead toe by the hump 14. At the initial stage of rim assembling, the bead portion 3 of the tire 1 locates in the drop or well portion having a diameter smaller than that of the hump 14, so that it rides over the hump 14 from a largely eccentric state with respect to the standard rim to move on the slant bead seat 6. But the bead portion 3 just before moving on the slant bead seat is still eccentric with respect to the rim. When the hump 14 is housed in the annular groove 16 formed in the bottom of the expanded heel 10 over the full periphery, the eccentric state is considerably lessened, so that after the bead portion rides over the hump 14, the expanded heel 10 or the local torus 12 first contacts with the rounded concave corner portion 7 to cause compressive deformation and then the outer surface of the bead portion smoothly contacts with the curved portion 9 of the flange 8 under a proper pressure to complete the rim assembling. Thus, the rotational axis of the tire is easily aligned with the rotational axis of the rim. If the axial width W of the annular groove 16 is less than 0.2 of the bead width γ, the recession to the hump 14 is too small and the resistance to riding over the hump 14 in rim assembling is hardly mitigated to reduce the effect by the formation of the expanded heel 10. If it exceeds 0.3, the recession to the hump 14 is too large and there is a fear of causing eccentric state after the fitting of the bead portion to the rim though the bead portion easily rides over the hump 14.

At least expanded heel 10 or local torus 12 in the bead portion 3 is made from a hard rubber stock having a JIS-A hardness of not less than 60° preferably not less than 65° which can advantageously lead an equal contact with the rounded concave corner portion 7 over the full periphery, but the upper limit of the rubber hardness is preferably 80°.

The following examples are given in illustration of the invention and are not intended as limitations thereof.

EXAMPLE 1

A tire-wheel assembly is manufactured by using a pneumatic tubeless tire for small-size passenger car having a tire size of 205/65 R15 and an adaptable rim of 15×6JJ (according to JATMA YEAR BOOK 1991). In this case, an expanded heel 10 having various expansion quantities α as shown in FIG. 1 is formed in a bead portion 3 of the tire and has a JIS-A hardness of 70°. Then, RRO (mm) and RFV (kgf) of the tire-wheel assembly are measured to obtain results as shown in Table 1.

TABLE 1

|  | Control (FIG. 7) | Comparative Example | Example 1 | | | |
| --- | --- | --- | --- | --- | --- | --- |
| α (mm) | 0 | 1.0 | 2.0 | 3.0 | 4.0 |
| RRO (mm) | 0.53 | 0.47 | 0.21 | 0.18 | 0.20 |
| RFV (kgf) | 8.3 | 7.8 | 5.1 | 4.7 | 4.6 |

In the tire-wheel assembly, when the expansion quantity α is 3.0 mm, the expanded heel 10 is compressed by about 1 mm in rim assembling. Even in the modified embodiments of FIGS. 2 and 3, the interference of the bead portion 3 is unified into the conventionally known shape so that the radially inward face of the bead portion is inclined at an angle somewhat larger than that of the slant bead seat 6 of the rim to be closely fitted thereto.

Thus, the interference of the bead portion 3 is sufficient to be a value according to the conventional technique. For example, the inclination angle of the inward face in the bead portion may be a larger inclination of plural stages at the bead toe.

The bead core 5, may be made of the conventionally known construction. For example, the bead core 5 may be formed by spirally winding a single steel reinforcing element thinly coated with rubber to form substantially a rectangle in cross-section as described in Japanese Utility Model laid open No. 61-8804. It may be a so-called cable bead core obtained by using a soft steel filament as a core and winding a single filament of small diameter around the core.

EXAMPLE 2

In the same tire-wheel assembly as in Example 1, when the ratio of the expansion quantity α in the bead portion 3 of the tire to the fitting width β of the radially inward face of the bead portion is varied within a range of 0.06–0.30, RRO is not more than about 0.20 mm and RFV is not more than about 5 kgf. Moreover, when the tire size is varied, it is required to increase the expansion quantity α in accordance with the fitting width β. If the ratio of α/β exceeds 0.3, the tendency of causing rim slipping becomes stronger.

EXAMPLE 3

In the same tire-wheel assembly as in Example 1, when a chamfered portion 15 is formed in a bead toe located opposite to the expanded heel 10 of the bead portion 3 as shown in FIG. 4 and the ratio of axial length t of the chamfered portion to width γ of the bead portion in the widthwise direction is within a range of 0.2–0.4. Even if the expansion quantity α is increased by 2–8 mm, there are obtained results equal to or greater than that of Example 1.

EXAMPLE 4

In the same tire-wheel assembly as in Example 1, when an annular groove 16 is formed in the bottom of the expanded heel 10 of the bead portion 3 as shown in FIG. 5 and the ratio of the axial width W of the annular groove to the bead width γ is 0.25, a better result is obtained.

EXAMPLE 5

A cord reinforcing layer 17 made of nylon cords of 840 d/2 arranged at a cord angle of 85° with respect to a tangent line at the top T of the expanded heel 10 is arranged along the contour of the expanded heel 10 as shown in FIG. 6. In this case, the same results on RRO and RVF as in Example 1 are obtained. Then, a bead portion durability is evaluated by an occurrence ratio of bead portion failure after the tire is run on drum testing machine at a speed of 60 km/hr under a load of 450 kgf over a distance of 1000 km when the expansion quantity α is 3 mm. As a result, the occurrence ratio of bead portion failure is 2 tires/50 tires, which is fairly lower than 5 tires/50 tires having no cord reinforcing layer.

As mentioned above, according to the invention, the exact seating of the expanded heel in the bead portion onto the rounded concave corner portion of the rim is attained in the normally used rim without changing the profile of the rim and taking special care in the rim assembling, so that the value of RRO as a tire-wheel assembly can be reduced and hence the value of RVF can effectively controlled.

What is claimed is:

1. A pneumatic tire having an improved uniformity at a tire-wheel assembled state and including a pair of bead portions each closely fitted into a slant bead seat of a standard rim when the tire is mounted on the standard rim, which standard rim includes for each bead portion a rounded concave corner portion smoothly connected to the corresponding slant bead seat and a flange protrusively extending outward from the corresponding rounded concave corner portion and having a curved portion in a direction opposite to the protruding direction, wherein each bead portion of said tire has a substantially flat bottom surface and an expanded heel integrally united with the corresponding bead portion thus bringing about close fitting to the corresponding rounded concave corner portion of the standard rim over the full periphery of said corresponding rounded concave corner portion prior to contact between the corresponding curved portion of the standard rim and an outer surface of the corresponding bead portion facing thereto, each said expanded heel being a local torus reinforced with a ring-shaped core embedded therein.

2. The pneumatic tire according to claim 1, wherein, each said ring-shaped core comprises an endless band of a substantially inextensible cord.

3. A pneumatic tire having an improved uniformity at a tire-wheel assembled state and including a pair of bead portions each closely fitted into a slant bead seat of a standard rim when the tire is mounted on the standard rim, which standard rim includes for each bead portion a rounded concave corner portion smoothly connected to the corresponding slant bead seat and a flange protrusively extending outward from the corresponding rounded concave corner portion and having a curved portion in a direction opposite to the protruding direction, wherein each bead portion of said tire has a substantially flat bottom surface and an expanded heel integrally united with the corresponding bead portion thus bringing about close fitting to the corresponding rounded concave corner portion of the standard rim over the full periphery of said corresponding rounded concave corner portion prior to contact between the corresponding curved portion of the standard rim and an outer surface of the corresponding bead portion facing thereto, each said expanded heel being made from a rubber stock having a JIS-A hardness of not less than 60° and having a height of an expanded top defined by a vertical distance between a line extending axially inward from a radially inward face of the corresponding bead portion and a line parallel thereto and passing through the expanded top, said vertical distance being within a range of 1.5–10.5 mm.

4. The pneumatic tire according to claim 3, wherein each bead portion has an annular depression adjacent to the comprising expanded heel and facing the corresponding flange near the corresponding rounded concave corner portion.

5. The pneumatic tire according to claim 3, wherein each expanded heel is a local torus.

6. The pneumatic tire according to claim 5, wherein each local torus is reinforced with a ring-shaped core embedded therein.

7. The pneumatic tire according to claim 2, wherein a ratio of the expansion quantity of an expanded heel, measured between a line passing through a bead base point and perpendicular to an axis of the tire and a line in contact with the corresponding flange and perpendicular to an axis of the tire, and a fitted width of a radially inward face of the corresponding bead portion is within a range of 0.06–0.30.

8. The pneumatic tire according to claim 3, wherein the bead portion has a chamfered portion facing a hump of the standard rim at a bead toe located at a side opposite the corresponding expanded heel.

9. The pneumatic tire according to claim 8, wherein a ratio of an axial length of a chamfered portion to an axial width of the corresponding bead portion is within a range of 0.2–0.4.

10. The pneumatic tire according to claim 3, wherein an annular groove is formed in the bottom of each expanded heel over its full periphery.

11. The pneumatic tire according to claim 10, wherein a ratio of an axial width of an annular groove to the axial width of the corresponding bead portion is within a range of 0.2–0.3.

12. The pneumatic tire according to claim 3, wherein each expanded heel is provided with a cord reinforcing layer arranged along a contour of the corresponding expanded heel.

13. The pneumatic tire according to claim 12, wherein each said cord reinforcing layer adheres to an outer surface of the corresponding expanded heel.

14. The pneumatic tire according to claim 12, wherein, each said cord reinforcing layer comprises a plain weave fabric.

15. The pneumatic tire of claim 3, wherein each said bead portion has a single bead core embedded therein.

16. The pneumatic tire of claim 15, wherein each said bead core is a spirally wound single steel reinforcing element thinly coated with rubber to form a rectangular cross-sectional shape.

17. The pneumatic tire of claim 15, wherein each said bead core is a cable bead core having a soft steel filament core and a single filament of small diameter wound about said soft steel filament core.

* * * * *